United States Patent
Kleinrock et al.

(10) Patent No.: US 6,795,852 B1
(45) Date of Patent: Sep. 21, 2004

(54) AUTOMATIC NETWORK CONNECTION

(75) Inventors: Leonard Kleinrock, Los Angeles, CA (US); Joel E. Short, Los Angeles, CA (US)

(73) Assignee: Nomadix, Inc., Westlake Village, CA (US)

( * ) Notice: Subject to any disclaimer, the term of this patent is extended or adjusted under 35 U.S.C. 154(b) by 1002 days.

(21) Appl. No.: 08/712,502

(22) Filed: Sep. 11, 1996

Related U.S. Application Data

(60) Provisional application No. 60/003,541, filed on Sep. 11, 1995.

(51) Int. Cl.[7] ............................................. G06F 15/177
(52) U.S. Cl. ....................... 709/220; 709/219; 709/227; 379/114.02
(58) Field of Search ....................... 395/200.49, 200.52, 395/200.79, 673, 200.7, 200.71, 200.58; 379/112

(56) References Cited

U.S. PATENT DOCUMENTS

| | | | |
|---|---|---|---|
| 4,649,533 A | | 3/1987 | Chorley et al. |
| 4,757,267 A | | 7/1988 | Riskin |
| 5,253,161 A | * | 10/1993 | Nemirovsky et al. ....... 364/402 |
| 5,280,581 A | | 1/1994 | Bathrick et al. |
| 5,287,461 A | * | 2/1994 | Moore ........................ 395/275 |
| 5,289,371 A | | 2/1994 | Abel et al. |
| 5,289,536 A | | 2/1994 | Hokari |
| 5,335,268 A | | 8/1994 | Kelly, Jr. et al. |
| 5,337,352 A | | 8/1994 | Kobayashi et al. |
| 5,412,654 A | | 5/1995 | Perkins |
| 5,425,085 A | | 6/1995 | Weinberger et al. |
| 5,426,427 A | * | 6/1995 | Chinnock et al. ........... 340/827 |
| 5,430,782 A | * | 7/1995 | Brady et al. ............ 379/221.14 |
| 5,519,769 A | | 5/1996 | Weinberger et al. |
| 5,557,748 A | | 9/1996 | Norris |
| 5,586,269 A | | 12/1996 | Kubo |
| 5,596,722 A | * | 1/1997 | Rahnema ................ 395/200.15 |
| 5,602,991 A | * | 2/1997 | Berteau .................. 395/200.01 |
| 5,694,549 A | * | 12/1997 | Carlin et al. ............. 395/200.2 |
| 5,742,762 A | * | 4/1998 | Scholl et al. ............. 395/200.3 |
| 5,749,075 A | * | 5/1998 | Toader et al. .................. 705/14 |
| 5,774,535 A | * | 6/1998 | Castro ........................ 379/144 |
| 5,793,763 A | | 8/1998 | Mayes |
| 5,802,502 A | * | 9/1998 | Gell et al. ..................... 705/37 |
| 5,909,549 A | | 6/1999 | Compliment |
| 5,953,398 A | * | 9/1999 | Hill ............................. 379/112 |
| 6,003,770 A | * | 12/1999 | Schilling ................. 235/382.5 |
| 6,012,088 A | | 1/2000 | Li |

OTHER PUBLICATIONS

Leslie Jones, "America Online FAQ for Non–Members", USENET News posting Mar. 11, 1995. (retrieved from google.com) 6 pages.*

Sabra Chartrand, "Patents: A Little Box Holds Out the Enticing Promise . . . ", New York Times, at C6 (Jun. 17, 1996).

* cited by examiner

*Primary Examiner*—Dung C. Dinh
(74) *Attorney, Agent, or Firm*—Brooks Kushman P.C.

(57) ABSTRACT

Users call ONE telephone number from their computer communication link-up. The call goes into a computer which has a large database of the many providers' access numbers. The computer identifies where the user is calling from via any identifying feature included in the invention. The computer figures out the most appropriate (e.g. cheapest/proximal/etc.) number the user should use to connect to the "Net", which includes cost of the phone call and of the services provided by service providers. The computer then transmits this number back to the remote user, and electronically dials the local (and probably free) number to connect the user to the Net. The user may set up an account, or purchases one temporarily and gets charged for the service provided to him. Users are connected to information networks by providing a central processing station with a database including an index of network access numbers and associated charges for using the numbers. The central processing station is accessed from a remote computing device through a transmission line and identifying information is received by the remote computing device. The system compares the received information with the index of network access numbers stored in the database to determine a location of the remote computing device and to determine appropriate access numbers from the database index of network access numbers and then selects and downloads a most appropriate access number from the network access numbers to the remote computing device.

28 Claims, No Drawings

AUTOMATIC NETWORK CONNECTION

This application claims the benefit of U.S. Provisional Application Serial No. 60/003,541, filed Sep. 11, 1995.

BACKGROUND OF THE INVENTION

The invention relates to optimally accessing online information proximal to the geographical location of a user, especially those who travel much, and to make that accessing most cost effective.

The world of online communication is progressing in leaps and bounds. Online users have to access information via their personal computers (PC's) or laptop computers from the internet and/or World Wide Web (WWW). This often requires that the user dial out via a telephone modem to connect to some service, such as America OnLine, CompuServe, etc. Generally, users access online connections via telephone modems by dialling an access number. However, the user does not have any online access or information to shop and/or seek the most appropriate access numbers. The problem precipitates multi-fold when the user is travelling and must use a laptop to dial from a remote location, such as hotels, branch offices, public places, cellular phones, etc.

Existing systems either allow dialling from the remote location or dialling back to one's work/office base. That results in enormous long distance telephone charges. The issue is how to identify the most appropriate phone number to dial into. Moreover, local access numbers change, new ones are added, new access service providers arise, etc. Thus, the database of these numbers is large and dynamic, and quite impossible for the user himself to maintain easily.

There is a need for a cost effective service, that transcends geographical boundaries as well overcomes exorbitant cost barriers and facilitates access of online communication from any remote location.

Needs exist for a built-in database that automatically does the thinking and sorting for the user from the vast array of database and yet instantly provides optimal and least expensive access to the user. The present invention addresses those problems by uniquely providing such instant access at low costs to any user located in any place.

SUMMARY OF THE INVENTION

The present invention solves the existing problems uniquely. The user need call only ONE telephone number, such as an 800/888-type-number, from his/her computer communication link-up, such as a modem or the like. The call goes into a computer which has stored in its memory the large database of the many providers' access numbers.

The computer identifies where the user is calling from via any identifying feature enabled by the present invention. The computer then figures out the cheapest number the user should use to connect to the "Net"; that cost can include the cost of the phone call as well as the cost of the service provider.

The computer then transmits the selected number back to the remote user, and electronically dials the local (and probably free) number to connect the user to the Net. Of course, the user has earlier set up an account and gets charged for the service just provided to the user. There are many advantages of such a service uniquely provided by this invention.

Preferably, the method for connecting a user to an information network comprises providing a central processing station comprising a database including an index of network access numbers and associated charges for using the numbers; accessing the central processing station from a remote computing device through a transmission line; receiving identifying information from a calling area of the remote computing device; comparing the received information with the index of network access numbers stored in the database to determine a location of the remote computing device and to determine appropriate access numbers from the database index of network access numbers; selecting a most appropriate (e.g. least expensive, proximal, available without being busy, certain service type and geographically preferred) access number from the network access numbers; and downloading the most appropriate access number to the remote computing device.

In a preferred embodiment, the present invention further provides automatically dialing the most appropriate access number on the remote computing device. Further, access of the remote computing device to the central processing station may be terminated. Preferably, that termination may occur after the downloading and before the automatic dialing. The present invention provides for continuously or periodically updating the database of access numbers and periodic charges.

The database of network access numbers provided by the present invention may comprise tables of network connection charges for multiple network providers. Preferably, the database of network access numbers further comprises phone company charges for accessing the network.

The present invention also provides configuration of communication parameters of the remote computing device before dialing out the selected access number and automatically dialing the access number on the remote computing device.

Preferably, one method of accessing is done by placing a call from the remote computing device to the central processing system via a communicating device. The call is placed, for example, by dialing a 800- or 888-type number. The communicating device may be a modem or a digital link or the like. For example, the dialed number may be 1-800-NOMADIX or 1-888-NOMADIX The remote computing device can be configured to dial a predetermined number automatically.

For receiving identifying information, preferably, the central processing station is provided with an appropriate preferred or look-up number, such as an area code and/or prefix or full phone number.

The central processing station further comprises an automated calling area identifier. The accessing is achieved by placing a call from the remote computing device to the central processing system. Identifying can be done by routing the call to the automated calling area identifier and generating information relating to the automated calling area identifier.

In a preferred embodiment, the accessing is done by dialing a 1-800-type or a 1-888-type number and converting the dialed number to a calling area identification number. The identification number comprises appropriate look-up number such as an area code and prefix of the calling area.

The identifying also includes providing the central processing station with an area code and prefix of the calling area, and the comparing includes comparing calling area digits against the access numbers having the rates associated therewith. The present invention also includes, preferably, creating a set of appropriate access numbers following the comparing. Selection includes selecting the least expensive, closest, available and geographically desirable access number from the set and downloading the set of numbers to the remote computing device.

Preferred embodiments include dialing the most appropriate access number, an available access provider, or an access provider with a desired service, then checking for a connection to the network, and if necessary selecting a next most appropriate number from the set and dialing that number.

Preferably, the invention also involves billing for the connection provided to the user. Also, the user or service provider may be billed. The billing is done in several ways. Preferably, in one embodiment, by establishing a user account having a balance and deducting a determined amount from the user account, wherein the amount reflects fees and charges for connection to the network.
The invention includes checking the balance of the user's account prior to downloading the numbers to the remote computing device. Alternatively, a subscription service may be set-up, wherein subscribers can pay predetermined amounts and have corresponding unlimited use of the system.

Billing comprises providing an information carrier having user account information including account balance, reading the information on the carrier, electronically debiting an amount from the account balance reflecting costs and fees associated with connection to the network. The information carrier is any component of computing devices such as, for example but not limited to, floppy disks or smart cards or the like.

Preferably billing may also comprise providing an electronic payments provider system electronically connected to the central processing system and electronically sending user identification and cost information to the payments provider system for processing and billing.

In a preferred embodiment, the invention is an automatic network connection system comprising a central processing station, a remote computing device, a communication device for establishing a connection to the central processing station, a transmission line electronically connecting the remote computing device to the central processing station for carrying the connection (e.g. telephone call) to the station and other information between the station and the remote computing device, an identifier for determining an origination area of the telephone call and for generating a caller identification. The central processing station further comprises a database of network access numbers and associated costs for network connections and a processor for comparing the identifier to the database of network access numbers and associated costs for network connections, for selecting cost effective network access numbers from the database, and for downloading a least expensive number of the cost effective numbers to the computing device.

Preferably, the remote computing device further comprises a configuration for receiving the most preferred number or service and for automatically dialing the downloaded number.

A billing subsystem is electronically connected to or included as part of the central processing station. The billing subsystem further comprises an information carrier for carrying and storing user account information, an electronic reader for accessing the account information from the information carrier and for amending the information in response to debit messages from the central processing station. The information carrier is any component of computing devices, such as a floppy disk or a smart card, or the billing system may be an electronic payments provider service.

Preferably, the method for connecting a user to an information network comprises a central processing station, accessing the central processing station from a remote computing device through a transmission line, identifying the remote computing device, and electronically connecting the remote computing device to a network.

In a preferred embodiment, the automatic network connection system comprises a central processing station, a bank of communicating devices electronically connected to the station, a rotary phone line for connecting remote computing devices to the bank of communicating devices, and an access line electronically connecting the station to a network. The phone line is a 800-type or 888-type phone line.

These and further and other objects and features of the invention are apparent in the disclosure, which includes the above and ongoing written specification, with the claims and the drawings.

DETAILED DESCRIPTION OF THE PREFERRED EMBODIMENTS

In the present invention the user dials a single 800/888-type number; the computer at this 800/888-type number uses any identifier, such as Caller ID, to identify the current calling area of the user; the computer accesses its database to find the most appropriate phone access plus access provider; the master computer downloads this number and configuration information to the user's computer, configures the communication parameters and then automatically dials the number on the user's machine, thus connecting the user to the provider. In case the dialed access provider returns a busy signal or is out of order, the master computer will have sent down more than one choice which will then be used to provide automatic connection to the next best choice. From the user's view, he/she dials one number (always the same access number) and gets connected.

The invention addresses the following problems inherent in prior art systems:

Nomad Access Problems:
  Long distance charges expensive when traveling.
  Unsure of local access number—or even if one is available.
  Confusing and time consuming to configure access # and communication parameters, such as protocol settings, account information, at each new location.
  Unable to determine cheapest local access provider.
  No convenient way to bill call (especially at pay phones).
Solution:
Cheap & Transparent Dial-up Internet Access:
  Save money—use local access phone numbers—not long distance call—from the present database.
  No/little money needed by user.
  To obtain #, use a local access number clearing house maintained by the present database (e.g. Nomadix, Inc.).
  User/computer only remembers one phone number (e.g. 800/888-NOMADIX).
  User/computer gets access number from Nomadix.
  Company/credit card gets billed for 800/888-type lookup.
How It Works—User's Perspective:
  Computer dials 800/888-type #.
  Nomadix looks up cheapest access (probably local)/phone number/configuration info, etc.
  Computer gets feedback from Nomadix and hangs up.

Computer configures itself and dials local access #.

User is connected transparently, locally, and cheaply to the desired online site.

How It Works—Nomadix Perspective:

Phone company provides Nomadix with area code and pre-fix of caller identifier (e.g. Caller-ID).

Cost algorithm at Nomadix takes into consideration phone company $+internet access $.

Internet access providers give local access numbers and associated cost to Nomadix.

Nomadix maintains cross reference of local access numbers for each prefix/area code.

Nomadix maintains index of access numbers for quick retrieval for on-line caller. Each subscriber to 800/888-Nomadix has access ID used for billing company/credit card.

Optional 800/888-type Access:

Nomadix provides a premium 800/888-type # access service to internet.

Nomadix has a T1 line to internet and bank of communicating devices, such as modems, hooked to rotary 800/888-type phone line.

Premium 800/888-type access cost may be cheaper than long distance+internet access Premium 800/888-type access number definitely most transparent access number for nomad.

Other services, besides pure internet access, is provided by Nomadix, rather than another service provider.

Useful to the Non-Nomad:

Provides fault tolerance of relying on a single access provider.

Lookup provides/determines cheapest internet access cost (even if local cost remains fixed).

Auto-configuration capability.

Notes:

User may receive several duplicate dial in numbers, in order of cost, in case of busy signal.

User can subscribe to access provider(s) or Nomadix does and distributes (rents) to nomads.

Can bill on a per call or monthly flat rate basis.

No need to worry about data theft—continually updating.

Software can be given away for free since useless without 800/888-Nomadix service.

User can specify their own local access #'s (such as when their company provides access).

User can configure software to dial 800/888-type # first every time, or only on call failure, or on demand.

Natural incentive for Internet Access Providers to provide information to Nomadix (boost usage).

Makes Internet Access Provider's cost competitive with other internet access providers.

=>Thus local calls cheaper than long distance to office.

=>Thus more use of 800/888-Nomadix to determine local access #.

Use any identifier to locate users, such as GPS/caller ID.

Can think of this as a 800/888-type # referral service.

If billed on a per call basis, then a mechanism permits small amounts of money to be transferred from the user to Nomadix. This mechanism is provided automatically (e.g., through the network) using an electronic payments provider service; however, if that is not cost effective, then Nomadix provides the payment mechanism. One example of a Nomadix provided payment mechanism is to provide each user with electronic cash which is pre-purchased and debited electronically in increments no matter how small. The user may then replenish his electronic cash (credit) by further purchases. The electronic cash can be stored on any device (portable or otherwise); for example, on a machine readable/writable storage mechanism such as a floppy disk or smart card; the floppy disk is especially preferred since it is easily read/written by the user's access device (computer).

By allowing the user to connect via many possible access service providers (such as in case a service provider's access number is busy, disconnected, or otherwise unusable), this Nomadix service provides very high reliability to the user. This is in contrast to the current situation where a user typically connects through only one access provider.

This service may be configured to provide completely automated, unattended, reliable service to the Nomadix user.

In the present system a user is connected to an information network having a central processing station comprising a database which includes an index of network access numbers and associated charges for using the numbers. The central processing station is accessed from a remote computing device through a transmission line. Identifying information from a calling area of the remote computing device is received.

The system compares the received information with the index of network access numbers stored in the database to determine a location of the remote computing device and to determine appropriate access/look-up numbers from the database index of network access numbers. A most appropriate (e.g. least expensive, proximal, available-not busy, desired service type and/or geographically preferred) access number from the network access numbers is selected and downloaded to the remote computing device. The system allows for automatically dialing the most appropriate access number on the remote computing device. Further, access of the remote computing device to the central processing station may be terminated. That termination may occur after the downloading and before automatically dialing. The present invention provides for continuously or periodically updating the database of access numbers and periodic charges.

The database of network access numbers provided by the present invention comprises tables of network connection charges for multiple network providers. Preferably, the database of network access numbers further comprises phone company charges for accessing the network.

The present invention configures the remote computing device to dial out the selected access number and automatically dials the access number on the remote computing device.

One method of accessing is done by placing a call from the remote computing device to the central processing system via a communicating device. The call is placed, for example, by dialing a 800- or 888-type number. The communicating device may be a modem or a digital link or the like. For example, the dialed number may be 1-800-NOMADIX or 1-888-NOMADIX. The remote computing device is configured to dial a predetermined number automatically.

For receiving identifying information, preferably, the central processing station is provided with an appropriate preferred or look-up number, such as an area code and/or prefix or full phone number.

The central processing station further comprises an automated calling area identifier. The accessing is achieved by placing a call from the remote computing device to the central processing system. Identifying is done by routing the call to the automated calling area identifier and generating information relating to the automated calling area identifier.

In a preferred embodiment, the accessing is done by dialing a 1-800-type or a 1-888-type number and converting the dialed number to a calling area identification number. The identification number comprises appropriate look-up numbers such as an area code and prefix of the calling area.

The identifying also includes providing the central processing station with an area code and prefix of the calling area, and the comparing includes comparing calling area digits against the access numbers having the rates associated therewith.

The present invention creates a set of appropriate access numbers following the comparing. Selection includes selecting the least expensive, closest, available-not busy, any service type and geographically desirable access number from the set and downloading the set of numbers to the remote computing device.

Preferred embodiments include dialing the least expensive access number, an available access provider, or an access provider with a desired service, then checking for a connection to the network, and if necessary selecting a next most appropriate number from the set, and dialing the most appropriate number.

Preferably, the invention bills charges for the connection provided to the user. Alternatively or in conjunction, the user may be billed.

The billing is done in several ways. In one embodiment, billing is done by establishing a user account having a balance and deducting a determined amount from the user account, wherein the amount reflects fees and charges for connection to the network.

The system checks the balance of the user's account prior to downloading the numbers to the remote computing device. Alternatively, a subscription service is set-up, wherein subscribers pay predetermined amounts and have corresponding unlimited use of the system.

Billing includes providing an information carrier having user account information including account balance, reading the information on the carrier, electronically debiting an amount from the account balance reflecting costs and fees associated with connection to the network. The information carrier is any component of the computing devices such as, for example but not limited to, floppy disks or smart cards or the like.

Preferably billing includes an electronic payments provider system electronically connected to the central processing system and electronically sending user identification and cost information to the payments provider system for processing and billing.

In a preferred embodiment, the invention is an automatic network connection system comprising a central processing station accessible by a remote computing device for sending a telephone call to the central processing station via a transmission line electronically connecting the remote computing device to the central processing station for carrying the telephone call to the station and other information between the station and the remote computing device. An identifier is provided for determining an origination area of the telephone call and caller identification. The central processing station further has a database of network access numbers and associated costs for network connections and a processor for comparing the caller identification to the database of network access numbers and associated costs for network connections, for selecting cost effective network access numbers from the database, and for downloading a least expensive number of the cost effective numbers to the computing device.

Preferably, the remote computing device further comprises a configuration for receiving the most preferred number and for automatically dialing the downloaded number.

A billing subsystem is electronically connected to or included as part of the central processing station. The billing subsystem further comprises an information carrier for carrying and storing user account information, an electronic reader for accessing the account information from the information carrier and for amending the information in response to debit messages from the central processing station. The information carrier is any component of computing devices such as, a floppy disk or a smart card or the billing system may be an electronic payments provider service.

The present method connects a user to an information network comprising a central processing station. The user accesses the central processing station from a remote computing device through a transmission line connecting the station and the device. The remote computing device is identified and electronically connected to a network.

In a preferred embodiment, the automatic network connection system comprises a central processing station, a bank of communicating devices electronically connected to the station, a rotary phone line for connecting remote computing devices to the bank of communicating devices, and an access line electronically connecting the station to a network. The phone line is a 800-type or 888-type phone line.

While the invention has been described with reference to specific embodiments, modifications and variations of the invention may be constructed without departing from the scope of the invention, which is defined in the following claims.

We claim:

1. A method for connecting a user to a computer information network via a computer network provider comprising the steps of:

providing a central processing station comprising a database including an index of computer network access numbers associated with multiple computer network providers, associated information for using the computer network access numbers, and computer connection costs for the computer network providers, wherein each computer network access number is associated with one of the computer network providers and each computer network provider is associated with one of the computer connection costs;

accessing the central processing station from a remote computing device through a transmission line;

receiving location identifying information from the remote computing device;

comparing the received location identifying information with the index of computer network access numbers stored in the database;

selecting at least one appropriate computer network access number from the database; and downloading the selected appropriate computer network access number to the remote computing device.

2. The method of claim 1, further comprising the step of automatically dialing the downloaded computer network access number from the remote computing device, wherein the downloaded computer network access number is a least expensive, available, desired service type, proximal, or geographically desirable number.

3. The method of claim 2, further comprising the step of terminating access of the remote computing device to the central processing station after the downloading step and before the automatically dialing step.

4. The method of claim 1, further comprising the step of continuously or periodically updating the database of access numbers and associated information.

5. The method of claim 1, wherein the database of computer network access numbers further comprises phone company charges for accessing each computer network.

6. The method of claim 1, wherein the associated information includes computer communication parameters further comprising the steps of configuring the remote computing device to dial the selected computer network access number and automatically dialing the computer network access number from the remote computing device.

7. The method of claim 1, wherein the accessing step further comprises placing a call from the remote computing device to the central processing system via a communicating device.

8. The method of claim 7, wherein the placing step further comprises dialing a toll free number.

9. The method of claim 7, wherein the placing step further comprises configuring the remote computing device to dial a predetermined number automatically.

10. The method of claim 1, wherein the central processing station further comprises an automated calling area identifier, wherein the accessing step further comprises placing a call from the remote computing device to the central processing system, and wherein the identifying step further comprises processing the received location identifying information from the remote computing device using the automated calling area identifier.

11. The method of claim 1, wherein the accessing step further comprises dialing a toll free number, and wherein the identifying step further comprises converting the toll free number to a calling area identification number.

12. The method of claim 1, further comprising the steps of creating a set of cost effective access numbers following the comparing step, and wherein the selecting step further comprises selecting the least expensive access number from the set, and wherein the downloading step further comprises downloading the set of numbers to the remote computing device.

13. The method of claim 12, further comprising the steps of dialing the least expensive access number, checking for a connection to the network, selecting a next least expensive number from the set, and dialing the next least expensive number.

14. The method of claim 1, further comprising the step of billing for a connection.

15. The method of claim 14, wherein the billing step further comprises the step of establishing a user account having a balance and deducting a determined amount from the user account, wherein the amount reflects fees and charges for connection to the network.

16. The method of claim 15, further comprising the step of checking the balance of the user's account prior to downloading the numbers to the remote computing device.

17. The method of claim 14, wherein the billing step further comprises providing an information carrier having user account information including account balance, reading the information on the carrier, electronically debiting an amount from the account balance reflecting charges and fees associated with connection to the network.

18. The method of claim 17, wherein the information carrier is a component of a computing device.

19. The method of claim 14, wherein the billing step further comprises providing an electronic payments provider system electronically connected to the central processing system and electronically sending user identification and cost information to the payments provider system for processing and billing.

20. An automatic computer network connection system for connecting a remotely located computing device to the computer network via a computer network provider, the system comprising:

a central processing station;
a remote computing device for placing a telephone call to the central processing station;
a transmission line for providing communication between the remote computing device and the central processing station for carrying the telephone call to the station and other information between the station and the remote computing device; and
an identifier for determining an origination area of the telephone call, wherein the central processing station further comprises a database of computer network access numbers associated with multiple computer network providers, and associated charges for computer network connections provided by the computer network providers, wherein each computer network access number is associated with one of the computer network providers and each computer network provider is associated with one of the computer network connection charges, wherein the central processing station further comprises a processor for comparing the identifier to the database of computer network access numbers and associated charges for the computer network connections, for selecting cost effective network access numbers from the database, and for downloading a least expensive network access number of the cost effective network access numbers to the remote computing device.

21. The system of claim 20, wherein the remote computing device further comprises a configuration for receiving and downloading an appropriate access number and for automatically dialing the downloaded number.

22. The system of claim 20, further comprising a billing subsystem electronically connected to or included as part of the central processing station.

23. The system of claim 22, wherein the billing subsystem further comprises an information carrier for carrying and storing user account information, an electronic reader for accessing the account information from the information carrier and for amending the information in response to debit messages from the central processing station.

24. The system of claim 23, wherein the information carrier is a floppy disk or a smart card.

25. The system of claim 22, wherein the billing system is an electronic payments provider service.

26. A method for providing cost effective telephone access to a first computer network for a remotely located computing device, the method comprising:

dialing a toll free telephone number using the remotely located computing device to establish a connection with a central processing station having a database including a plurality of telephone access numbers for computer networks connected to the first computer network, wherein the database further includes cost information associated with using the computer networks and/or cost information associated with the telephone access numbers of the computer networks;

automatically receiving location identifying information based on a telephone number associated with the current location of the remote computing device;

selecting a telephone access number from the database based on the location identifying information and the cost information associated with the telephone access number;

downloading the selected telephone access number from the database to the remotely located computing device; and automatically dialing the selected telephone access number using the remotely located computing device to access the first computer network.

27. The method of claim 26 wherein the step of selecting a telephone access number comprises selecting at least one telephone access number based on the access number currently being available.

28. The method of claim 26 wherein the database further includes computer communication parameters associated with at least one of the plurality of networks, the method further comprising downloading the associated computer communication parameters to the remotely located computing device and automatically configuring the remotely locating computing device using the computer communication parameters.

* * * * *